United States Patent
Dale et al.

(10) Patent No.: US 11,530,732 B2
(45) Date of Patent: Dec. 20, 2022

(54) METHOD OF FABRICATING THIN FORM FACTOR VIBRATION ISOLATORS WITH STABLE STORAGE MODULUS PROPERTIES OVER EXTENDED TEMPERATURE RANGES AS STANDALONE PARTS

(71) Applicant: Raytheon Company, Waltham, MA (US)

(72) Inventors: Eric T. Dale, Tucson, AZ (US); Dante San Miguel, Irvine, CA (US); Robert S. Turk, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 898 days.

(21) Appl. No.: 16/373,072

(22) Filed: Apr. 2, 2019

(65) Prior Publication Data

US 2020/0318709 A1 Oct. 8, 2020

(51) Int. Cl.
*F16F 15/08* (2006.01)
*B23Q 11/00* (2006.01)

(52) U.S. Cl.
CPC .......... *F16F 15/08* (2013.01); *B23Q 11/0032* (2013.01)

(58) Field of Classification Search
CPC . F16F 15/08; F16F 15/04; F16F 15/02; B23Q 11/0032; B29C 43/24; B29C 69/001; B29C 2791/006; B29C 2793/009; B29K 2083/005; B29L 2031/721
USPC ....... 248/560, 562, 568, 569, 603, 604, 605, 248/606, 609, 615, 618, 622, 632, 633, 248/634; 264/138, 145, 148, 102, 160, 264/175, 236, 331.11
See application file for complete search history.

(56) References Cited

U.S. PATENT DOCUMENTS

| | | | | |
|---|---|---|---|---|
| 4,401,534 | A * | 8/1983 | Goepp | A61F 6/08 264/222 |
| 5,590,714 | A * | 1/1997 | Van Steenwyk | E21B 47/017 73/431 |
| 8,919,724 | B2 * | 12/2014 | Rangaswamy | G02B 7/028 248/603 |
| 10,737,414 | B1 * | 8/2020 | Stevenson | B41M 5/03 |
| 11,075,507 | B2 * | 7/2021 | Seraj | H02G 15/18 |
| 2003/0166777 | A1 * | 9/2003 | Vachon | C08L 83/04 525/100 |

(Continued)

OTHER PUBLICATIONS

Momentive Inventing Possibilities RTV560, Technical Data Sheet, Mar. 28, 2012.

(Continued)

*Primary Examiner* — Terrell L McKinnon
*Assistant Examiner* — Michael McDuffie
(74) *Attorney, Agent, or Firm* — Schwegman Lundberg & Woessner, P.A.

(57) ABSTRACT

A liquid RTV material is calendared and cured to form a sheet of Silicone material. The de-gassing, pressing and curing steps are tailored to provide a low porosity Silicone sheet having a fine surface finish and consistent chemical properties. The sheet is stamped or cut to form standalone vibration isolators having a thin and dimensionally stable form factor of less than 1.25 mm that exhibit a stable storage modulus to temperature excursions below −30° C. and preferably over a range of −60° C. to 100° C.

20 Claims, 3 Drawing Sheets

(56) References Cited

U.S. PATENT DOCUMENTS

| | | | | |
|---|---|---|---|---|
| 2007/0216061 A1* | 9/2007 | Karthauser | ............... | C08J 7/02 |
| | | | | 264/237 |
| 2009/0010471 A1* | 1/2009 | Okazaki | ............... | H04R 9/043 |
| | | | | 427/535 |
| 2012/0097194 A1* | 4/2012 | McDaniel | ............... | C09D 5/14 |
| | | | | 435/197 |
| 2012/0233855 A1* | 9/2012 | Hoffer | ............... | A61N 1/0556 |
| | | | | 264/138 |
| 2016/0047119 A1* | 2/2016 | Dollhopf | ............... | B64F 1/26 |
| | | | | 181/290 |

OTHER PUBLICATIONS

Momentive Inventing Possibilities Silplus 60 CW, Technical Data Sheet, Jan. 3, 2019.

* cited by examiner

METHOD OF FABRICATING THIN FORM FACTOR VIBRATION ISOLATORS WITH STABLE STORAGE MODULUS PROPERTIES OVER EXTENDED TEMPERATURE RANGES AS STANDALONE PARTS

BACKGROUND OF THE INVENTION

Field of the Invention

This invention relates to vibration isolators and more particularly to a method of fabricating vibration isolators having a thin form factor and exhibiting stable storage modulus properties over extended temperature ranges as standalone parts.

Description of the Related Art

Vibration isolation is the process of isolating an object, such as a piece of equipment, from the source of vibrations. Passive vibration isolation makes use of materials and mechanical linkages that absorb and damp mechanical waves (e.g., vibrations). Passive isolation includes such techniques as rubber pads or mechanical springs and may be used in industrial equipment such as pumps, motors, HVAC systems, or washing machines, sensitive laboratory equipment IMUs, visions systems and other electromechanical and optomechanical systems that require isolation from structural inputs.

Factors influencing the selection and design of a particular passive vibration isolator include characteristics of the isolated object (size, weight, movement, isolation specifications), size constraints, operating environment (operating temperature range), cost and nature of the vibrations (frequencies, amplitudes) among others. These factors will determine a certain range of thickness and dimensional stability, mechanical properties such as Shore A hardness and a specified storage modulus and variability over an operating temperature range. If the isolator is too stiff, it won't dampen the vibrations. If it is too soft, it may actually amplify certain vibrations.

A sub-class of passive vibration isolators includes isolators that can be "cast-in-place" between the system and the isolated object. One approach is to pour low viscosity RTV (room temperature vulcanizing) material such as RTV 560 having a viscosity of less than 100,000 centipose (cps), and typically between 30,000 and 40,000 cps, into the "cast". RTV 560 has a viscosity similar to maple syrup. The RTV is cured for 24 hours at room temperature and humidity (See Momentive RTV560 TDS). Room temperature is typically 23° C.+/−2° C. and room relative humidity is typically between 15% and 40%. For example, RTV 560 retains its elastomeric properties (storage modulus) from −155° C. to 260° C.

Another known approach is to use a Heat Cured Rubber (HCR) material aka as High Temperature Vulcanizing (HTV) materials having a consistency similar to a "gummy bear". The solid HCR material is mixed with a curing agent and formed into a sheet by passing it through a pair of rollers. The sheet is cured at an elevated temperature (e.g., 120° C.) for 10 minutes (See Momentive Silplus 60 CW TDS). The vibration isolators can be die cut or stamped from the sheet to form standalone parts.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method of fabricating a sub-class of vibration isolators as standalone parts. These isolators have a thin form factor of less than 1.25 mm and exhibit dimensional stability throughout the part. The isolators have a stable storage modulus of between 2,000 and 5,000 KPa over an operating temperature range that includes excursions below −30° C. A typical operating temperature range may span at least −60° C. to 100° C. These isolators are particularly useful for applications that require standalone parts, thin and stable form factor and maintenance of the storage modulus at very low temperatures.

This is accomplished by providing a liquid room temperature vulcanizing (RTV) material having a viscosity of less than 100,000 centipose (cps). The liquid RTV material is calendared (between a pair of rollers) to press the liquid RTV material into a sheet, which is cured to form solid Silicone. One or more vibration isolators are stamped or cut from the Silicone sheet. The de-gassing, pressing and curing steps are tailored to provide a low porosity Silicone sheet having a fine surface finish and consistent mechanical and chemical properties over the operating temperature range.

In a particular embodiment, calendaring comprises the steps of adjusting a gap between a pair of rollers to a specified sheet thickness of less than 1.25 mm, providing a pair of calendaring plates joined at one end, adding a stiffening material to the outside surface of each said plate, inserting the calendaring plates joined end first between the pair of rollers, mixing the liquid RTV with a catalyst, de-gassing the liquid RTV material for at least 10 minutes, pouring the liquid RTV material between the plates and running the calendaring process to press the liquid RTV material between the rollers into a sheet of liquid RTV material. Curing the sheet of liquid RTV material comprising the steps of curing the sheet of liquid RTV material at room temperature and room humidity for at least 24 hours to cross-link the RTV material to provide dimensional stability to form the sheet of solid Silicone material, removing the sheet of solid Silicone material from both the top and bottom calendaring plates, curing the material at room temperature and an elevated relative humidity of at least 45% to increase the cross-linking followed by post curing the material at an elevated temperature of at least 110° C. complete crosslinking and stabilize the Silicone material to form a sheet of solid Silicone material.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
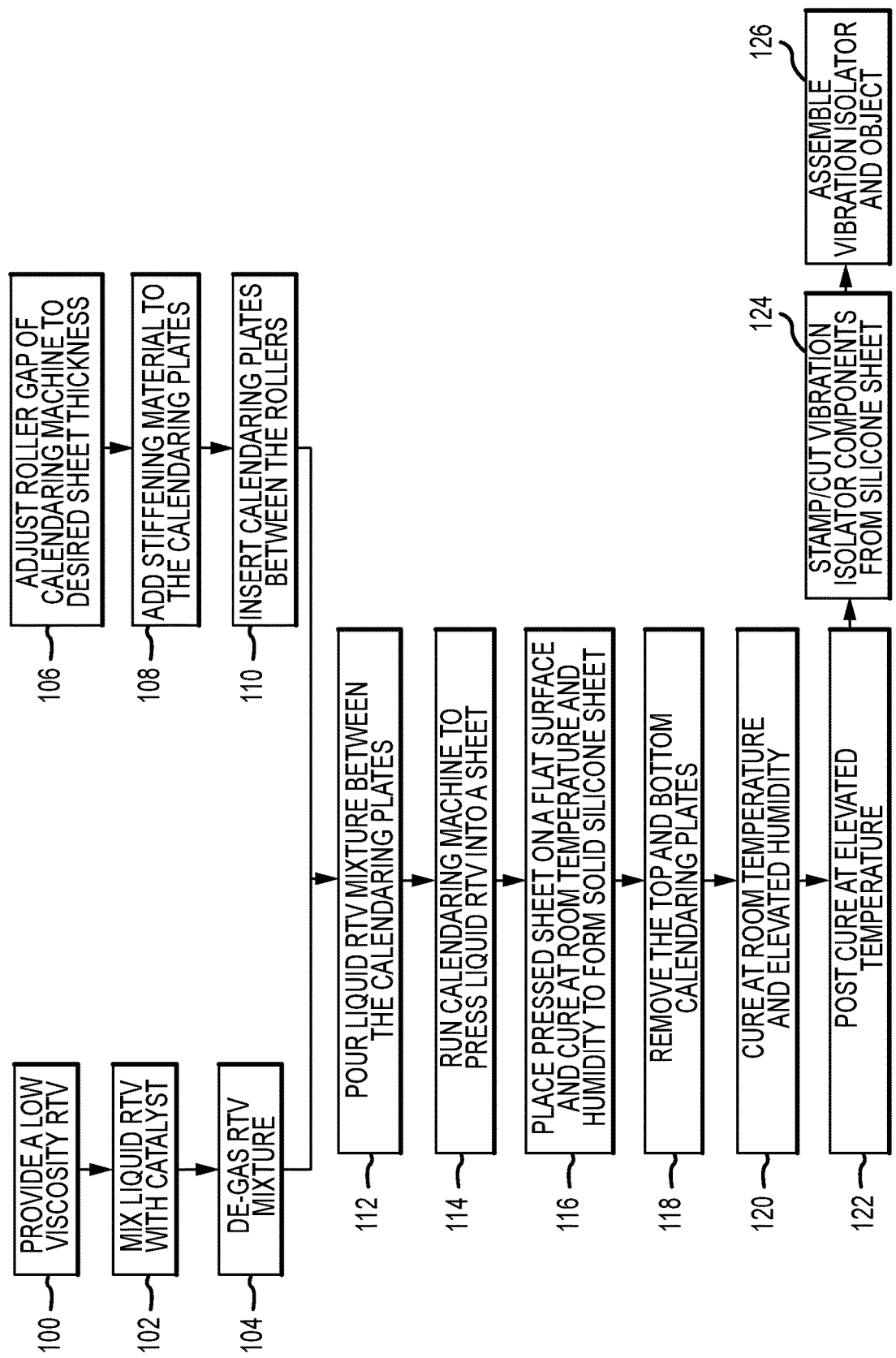
FIGS. 1 and 2 are embodiments of a flow diagram and a process flow for fabricating vibration isolation components having a thin form factor and exhibiting stable storage modulus properties over extended temperature ranges.

The present invention is directed to a method of fabricating a particular sub-class of passive vibration isolators having characteristics, which taken in combination pose unique challenges to the fabrication. First, the isolator must be fabricated as a standalone part. This part has a thin form factor <1.25 mm thick and must exhibit dimensional stability across the surface e.g. a variation of less than +/−<0.127 mm. The part should exhibit stable mechanical properties including a Shore A hardness of between 64-66 at room temperature that remains stable over an operating temperature range. To provide the requisite dampening, the part must exhibit a storage modulus of 2,000 to 5,000 KPa over the operating temperature range including temperature excursions to less than −30° C. In typical applications, the part should exhibit less than a 700 Pa variation over an extended temperature range of −60° C. to 100° C. Providing the requisite storage modulus (damping properties) in a standalone part with such a thin form factor to temperatures below −30° C. was particularly challenging.

The known processes of casting-in-place a liquid RTV or rolling HRC into sheets and curing were not viable. A CIP RTV cannot provide a standalone part or satisfy the dimensional stability requirements. The HRC materials only exhibit stable storage modulus down to −20 C and are not viable in a form factor <1.25 mm.

We attempted to use an Injection Molding technique with the liquid RTV 560 to form the passive vibration isolators to these specifications. Injection Molding can provide standalone parts and in theory the liquid RTV can provide stable chemical properties (e.g., storage modulus) well below −60° C. Unfortunately this approach was not viable. Liquid RTV is "humidity cured", which requires moisture to permeate throughout and material. Unlike cast-in-place, injection molding has a limited number of small vent holes, which did not allow sufficient moisture permeation. This resulted in highly porous material with greatly varying mechanical and chemical properties. We reached out to multiple suppliers of Silicone sheets to provide sheets to these specifications and no one bid the request. We then considered using liquid RTV with a standard calendaring process to form Silicon sheets. However, the liquid RTV runs during calendaring and the resultant Silicone sheet tends to wrinkle and is highly porous, and therefore is not suitable. The dimensional stability, mechanical and chemical properties of the sheet were all degraded.

To achieve the extended operating temperature range to below −30° C. and preferably to at least −60° C., we concluded that we needed to use a low viscosity RTV material such as RTV 560. To take advantage of the properties of RTV, a process for fabricating the liquid RTV into a solid Silicone sheet w/ the desired thin and uniform form factor and stable chemical properties (storage modulus and Shore A hardness) over the extended temperature range from which standalone parts could be stamped or cut had to be developed.

To accomplish this we modified a standard calendering process and the cure schedule specified in the RTV 560 TDS (Technical Data Sheet) by (a) adding a "stiffening material" to the calendaring plates to maintain the uniform thickness and surface finish of the sheet (prevents wrinkling), (b) extending the degassing of the RTV far beyond that called for in the TDS to reduce the porosity, e.g., from a specified 2-3 minutes to at least 10 minutes and (c) implementing a 3-step curing process to provide dimensional stability by first curing the material at room temperature and relative humdity for at least 24 hours to cross-link the RTV to form a solid Silicone, removing the top calendering plate and curing the sheet at room temp and elevated humidity to increase cross-linking and finally post curing the sheet at an elevated temperature to stabilize the material and complete the cross-linking. The resulting Silicone sheet and passive vibration isolators satisfy the requirements for standalone parts, thin and stable form factor and stable storage modulus over an extended temperature range.

Figure 2:
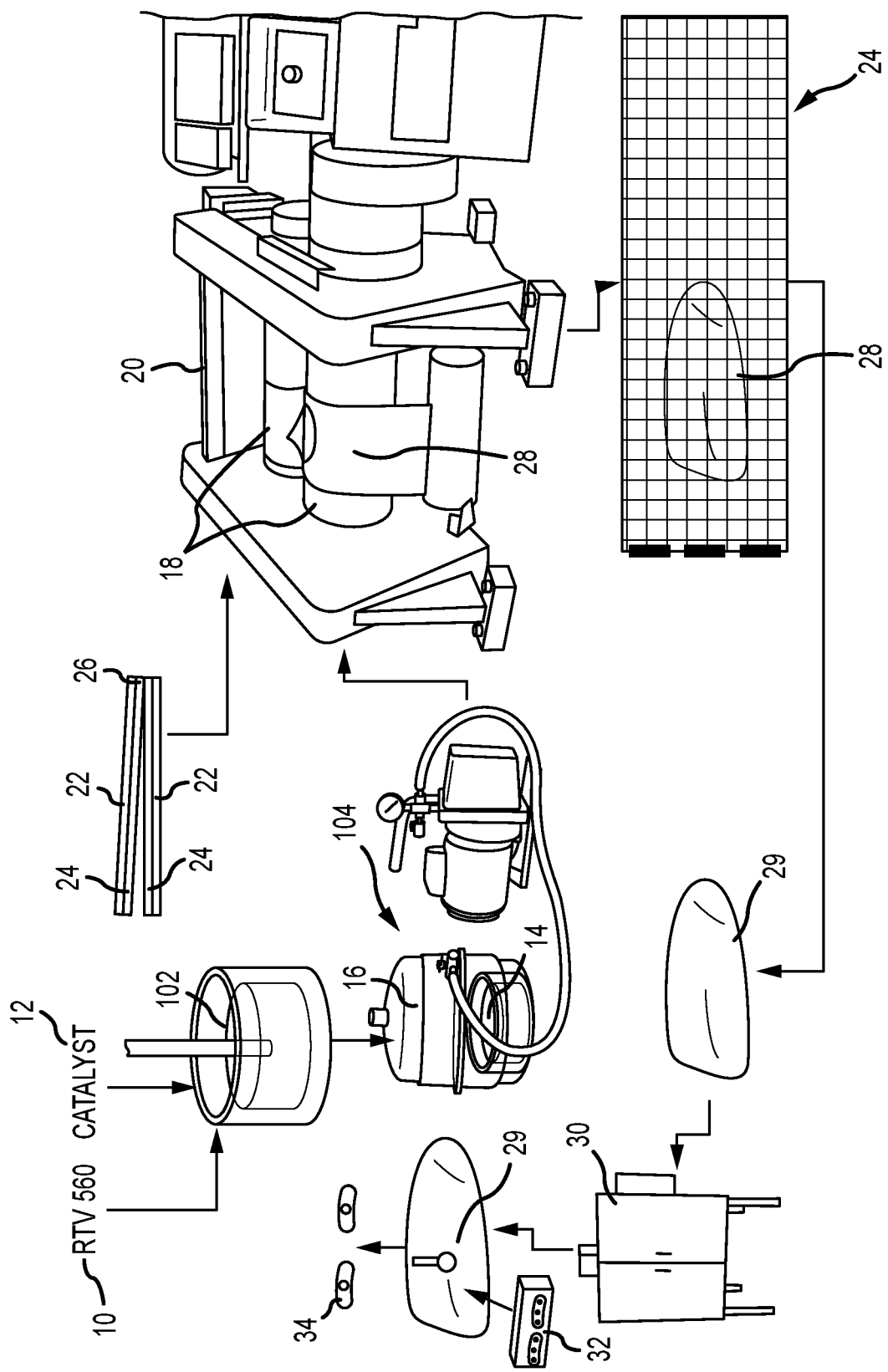

Referring now to FIGS. 1 and 2, an embodiment of the method of fabricating passive vibration isolators includes providing a low viscosity RTV material 10 (step 100) such as RTV 560. As described in the Momentive TDS for RTV 560, the material is a Silicone rubber compound comprising low temperature two-part Silicone elastomers. RTV 560 is designed for a "room temperature cure" and once cured has a continuous useful operating temperature range that spans—115° C. to 260° C. with a Shore A hardness of 55. As stated, RTV is typically used for cast-in-place heat shielding and potting and encapsulation of electrical assemblies. The RTV acts as both a vibration and thermal isolator. The RTV material 10 is mixed with a catalyst 12 (step 102) suitably DBT (dibutyl tin dilaurate) as a curing agent. The mixture 14 is placed in a vacuum 16 and de-gassed for an extended period of time of at least 10 minutes (step 104). The vacuum pressure is suitably less than 650 torr. Extended degassing reduces the porosity of the material.

The gap between a pair of rollers 18 of a calendaring machine 20 is adjusted to a specified sheet thickness of less than 1.25 mm (step 106). A stiffening material 22 is added to the outside surface of each of a pair of calendaring plates 24 joined at one end 26 (step 108). In an embodiment, the calendaring plates are Poly Tetra Fluoro Ethylene (PTFE) coated fiberglass plates and the stiffening material is a polyester film. Stiffening improves dimensional stability of the material during processing to prevent, for example, wrinkling. The stiffened calendaring plates 24 are inserted joined end first between the pair of rollers 18 (step 110).

The liquid RTV material 14 is poured between calendaring plates 24 (step 112) and the calendaring process (rollers 18) is run (step 114) to press the liquid RTV material between the rollers into a sheet 28 of liquid RTV material. Stiffened calendaring plates 24 and sheet 28 are removed from the calendaring machine and placed on a flat surface.

The 24 hour room temperature cure specified in the TDS and typically employed to cure RTV 560 is replaced with a three-step process designed to form a dimensional stable sheet with the desired mechanical and chemical properties over the operating temperature range. The three-step cure produces a Silicone with a Shore A hardness of 64-66, for example. First, sheet 28 is cured at room temperature and room humidity for at least 24 hours to cross-link the RTV material to provide dimensional stability to form a sheet of solid Silicone material 29 (step 116). Room temperature is typically 23° C.+/−2° C. and room relative humidity is typically between 15 and 40%. Both the top and bottom calendaring plates are removed (step 118) and the material is cured at room temperature and an elevated relative humidity of at least 45% to increase the cross-linking for a period of at least 18 hours (step 120). The material is post cured in an oven 30 at an elevated temperature of at least 110° C. for a period of at least 8 hours to complete crosslinking and stabilize the Silicone material to form the sheet of solid Silicone material. A specific humidity level is not a requirement for post cure. The chemistry at this point in the process does not require water (step 122). The Silicone sheet 29 is stamped with a die 32 or otherwise cut to form the passive vibration isolators 34 (step 124). One or more vibration isolators are assembled with an object to be isolated in a system (step 126).

Figure 3:
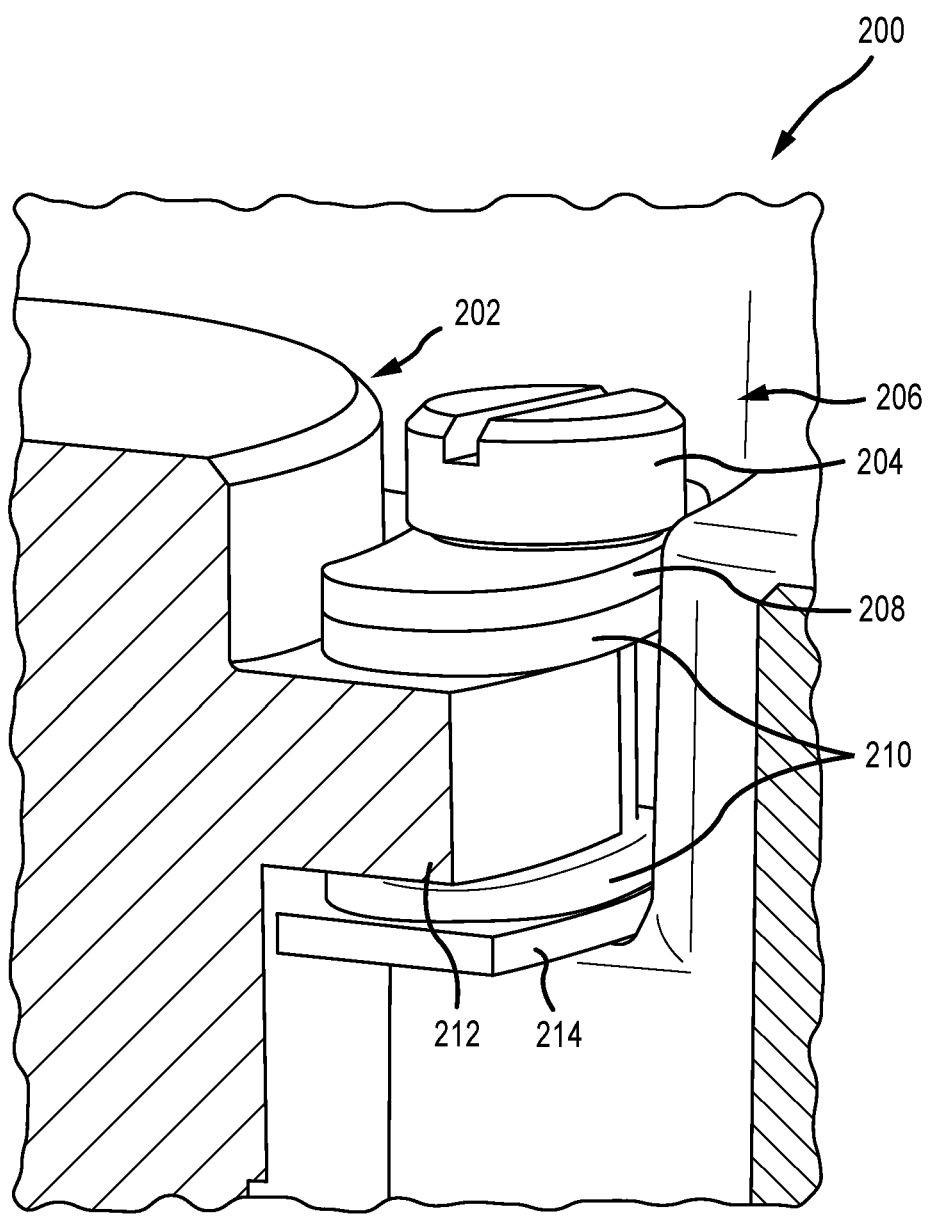
FIG. 3 is a diagram of an embodiment of an assembled vibration isolator.

Referring now to FIG. 3, in an embodiment a system 200 includes an object 202 that requires isolation from both mechanical and thermal inputs. In this system, one or more fasteners 204 secure the isolated object 202 to an upper level assembly 206. A washer 208 is used to distribute the load of the fastener 204 across the surface of a pair of passive vibration isolators 210 (of the type previously described), which are sandwiched between a mounting flange 212 of isolated object 202. A shim 214 may be inserted to adjust the height of the isolated object. In this system, the vibration isolators 210 must be standalone parts in order to be assembled with the fastener and washer in this manner and must have a thin form factor and dimensional stability. Furthermore, this particular system requires either continuous operation or excursions to temperatures less than −30° C.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of fabricating vibration isolators, comprising:
   providing a liquid room temperature vulcanizing (RTV) material comprising a Silicone elastomer having a viscosity of less than 100,000 centipose (cps);
   calendaring the liquid RTV material to press the liquid RTV material into a liquid sheet;
   curing the liquid sheet of liquid RTV material to form a sheet of solid Silicone material having a thickness of less than 1.25 mm; and
   forming one or more vibration isolators from the sheet of solid Silicone material, each said vibration isolator having a thickness of less than 1.25 mm and a storage modulus of between 2,000 KPa and 5,000 KPa at operating temperatures below −30° C.

2. The method of claim 1, further comprising:
   mixing the liquid RTV material with a tin catalyst.

3. The method of claim 2, wherein the viscosity of the liquid RTV material is between 30,000 and 100,000 cps.

4. The method of claim 1, wherein the storage modulus varies by less than 700 KPa at operating temperatures between −30° C. and 60° C.

5. The method of claim 1, wherein storage modulus varies by less than 700 KPa at operating temperatures between −60° C. and 100° C.

6. The method of claim 1, wherein the thickness of the sheet of solid Silicone material varies by less than +/−0.127 mm.

7. The method of claim 1, wherein the sheet of solid Silicone material has a Shore A hardness of between 64-66 at room temperature.

8. The method of claim 1, wherein the step of calendaring the liquid RTV material comprises:
   adjusting a gap between a pair of rollers to a specified sheet thickness;
   providing a pair of calendaring plates joined at one end;
   adding a stiffening material to an outer surface of each said plate;
   inserting the calendaring plates joined end first between the pair of rollers;
   mixing the liquid RTV material with a catalyst;
   de-gassing the liquid RTV material in a vacuum;
   pouring the liquid RTV material between the calendaring plates; and
   running the calendaring process to press the liquid RTV material between the rollers into the sheet of liquid RTV material.

9. The method of claim 8, wherein the calendaring plates are Poly Tetra Fluoro Ethylene (PTFE) coated fiberglass plates and the stiffening material is a polyester film.

10. The method of claim 8, wherein the liquid RTV material is de-gassed in a vacuum pressure of less than 650 torr for at least 10 minutes.

11. The method of claim 8, wherein the step of curing the pressed liquid RTV material comprises:
    curing the sheet of liquid RTV material at room temperature and room humidity for at least 24 hours to cross-link the RTV material to provide dimensional stability to form the sheet of solid Silicone material;
    removing the sheet of solid Silicone material from the calendaring plates;
    curing the material at room temperature and elevated relative humidity to increase the cross-linking; and
    curing the material at an elevated temperature and at least 30% relative humidity to complete crosslinking and stabilize the Silicone material.

12. The method of claim 10, wherein the Silicone sheet is post cured at an elevated temperature of at least 110° C.

13. The method of claim 1, wherein the step of curing the liquid RTV material comprises:
    curing the sheet of liquid RTV material at room temperature and room relative humidity for at least 24 hours to cross-link the RTV material to provide dimensional stability to form the sheet of solid Silicone material;
    removing the sheet of solid Silicone material from the calendaring plates;
    curing the material at room temperature and elevated relative humidity to increase the cross-linking; and
    curing the material at an elevated temperature to complete crosslinking and stabilize the Silicone material.

14. A method of fabricating vibration isolator components, comprising:
    providing a liquid room temperature vulcanizing (RTV) material having a viscosity of less than 100,000 centipose (cps);
    de-gassing the liquid RTV material in a vacuum at a vacuum press less than 650 torr for at least 10 minutes;
    calendaring the liquid RTV material between calendaring plates stiffened with a stiffening material to press the liquid RTV material into a liquid sheet;
    curing the liquid sheet of liquid RTV material at room temperature and room relative humidity for at least 24 hours to cross-link the RTV material to provide dimensional stability to form a sheet of solid Silicone material having a thickness of less than 1.25 mm;
    removing the sheet of solid Silicone material from the calendaring plates;
    curing the material at room temperature and elevated relative humidity to increase the cross-linking;
    curing the material at an elevated temperature to complete crosslinking and stabilize the Silicone material; and
    forming one or more vibration isolator components from the sheet of solid silicon material, each said vibration isolator component having a thickness of less than 1.25 mm that varies by less than +/−0.127 mm and a storage modulus of between 2,000 KPa and 5,000 that varies less than 700 KPa between operating temperatures between −60° C. and 100° C.

15. A method of fabricating vibration isolator components, comprising:

providing a liquid room temperature vulcanizing (RTV) material comprising a non-adhesive Silicone elastomer having a viscosity of less than 100,000 centipose (cps);

calendaring the liquid RTV material comprising the steps of:

adjusting a gap between a pair of rollers to a specified sheet thickness of less than 1.25 mm;

providing a pair of calendaring plates joined at one end;

adding a stiffening material to the outside surface of each said plate;

inserting the calendaring plates joined end first between the pair of rollers;

mixing the liquid RTV material with a catalyst;

de-gassing the liquid RTV material in a vacuum with a vacuum pressure of less than 650 torr for at least 10 minutes;

pouring the liquid RTV material between the plates; and running the calendaring process to press the liquid RTV material between the rollers into a liquid sheet of liquid RTV material, and curing the liquid sheet of liquid RTV material comprising the steps of:

curing the liquid sheet of liquid RTV material at room temperature and room humidity for at least 24 hours to cross-link the RTV material to provide dimensional stability to form the sheet of solid Silicone material;

removing the sheet of solid Silicone material from the calendaring plates;

curing the material at room temperature and an elevated relative humidity of at least 45% to increase the cross-linking; and curing the material at an elevated temperature of at least 110° C. to complete crosslinking and stabilize the Silicone material to form a sheet of solid Silicone material having a thickness of less than 1.25 mm; and forming one or more vibration isolator components from the sheet of solid silicon material, each said vibration isolator component having a thickness of less than 1.25 and a storage modulus of between 2,000 KPa and 5,000 that varies less than 700 KPA for operating temperatures between −60° C. and 100° C.

16. The method of claim 1, wherein the step of curing the liquid sheet of RTV material comprises curing the liquid RTV material to cross-link the RTV to form the solid Silicone, removing the sheet from the calendaring plates and curing the sheet to complete the cross-linking.

17. The method of claim 1, wherein the step of calendaring the liquid RTV material and curing the liquid sheet of RTV material comprises:

de-gassing the liquid RTV material in a vacuum at a vacuum pressure less than 650 torr for at least 10 minutes to reduce the porosity of the material;

adding a stiffening material to the calendaring plates to maintaining uniform thickness and surface finish of the sheet; and implementing a 3-step curing process to provide dimensional stability by first curing the liquid RTV material at room temperature and relative humdity for at least 24 hours to cross-link the RTV to form the solid Silicone, removing the sheet from the calendaring plates and curing the sheet at room temp and elevated humidity to increase cross-linking and finally post curing the sheet at an elevated temperature to stabilize the material and complete the cross-linking.

18. The method of claim 17, wherein the thickness of each said vibration isolator varies by less than +/−0.127 mm and the storage modulus varies less than 700 KPa for operating temperatures between −60° C. and 100° C.

19. A method of fabricating vibration isolators, comprising:

providing a liquid room temperature vulcanizing (RTV) material having a viscosity of less than 100,000 centipose (cps);

calendaring the liquid RTV material to press the liquid RTV material into a liquid sheet;

curing the liquid sheet of liquid RTV material to form a sheet of solid Silicone material having a thickness of less than 1.25 mm; and forming one or more vibration isolators from the sheet of solid Silicone material, each said vibration isolator having a thickness of less than 1.25 mm and a storage modulus of between 2,000 KPa and 5,000 KPa at operating temperatures below −30° C.

20. The method of claim 19, wherein the step of curing the liquid sheet of RTV material comprises curing the liquid RTV material to cross-link the RTV to form the solid Silicone, removing the sheet from the calendaring plates and curing the sheet to complete the cross-linking.

\* \* \* \* \*

UNITED STATES PATENT AND TRADEMARK OFFICE
CERTIFICATE OF CORRECTION

PATENT NO. : 11,530,732 B2
APPLICATION NO. : 16/373072
DATED : December 20, 2022
INVENTOR(S) : Dale et al.

It is certified that error appears in the above-identified patent and that said Letters Patent is hereby corrected as shown below:

In the Specification

In Column 3, Line 64, delete "humdity" and insert --humidity-- therefor

In Column 4, Line 36, delete "14" and insert --10-- therefor

In the Claims

In Column 8, Line 13, in Claim 17, delete "humdity" and insert --humidity-- therefor Signed and Sealed this
Fourteenth Day of November, 2023

Katherine Kelly Vidal
*Director of the United States Patent and Trademark Office*